Figure 1:
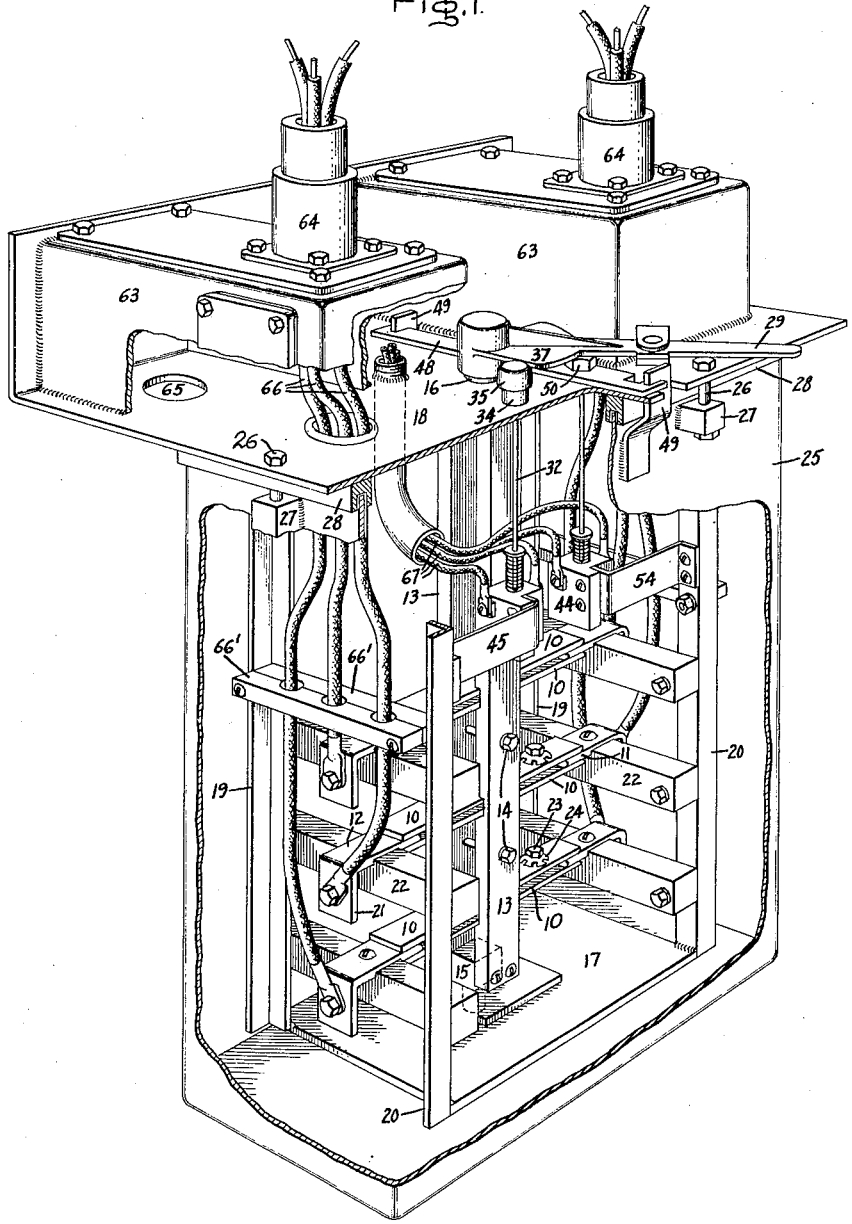

Feb. 3, 1942.  P. M. ENGEL ET AL  2,271,972
SWITCHING SYSTEM AND SWITCH FOR CONTROLLING ELECTRIC CIRCUITS
Filed Aug. 21, 1940  3 Sheets-Sheet 1

Inventors:
Phillip M. Engel,
Winton G. Harlow,
by Harry E. Dunham
Their Attorney.

Feb. 3, 1942.   P. M. ENGEL ET AL   2,271,972
SWITCHING SYSTEM AND SWITCH FOR CONTROLLING ELECTRIC CIRCUITS
Filed Aug. 21, 1940   3 Sheets-Sheet 2
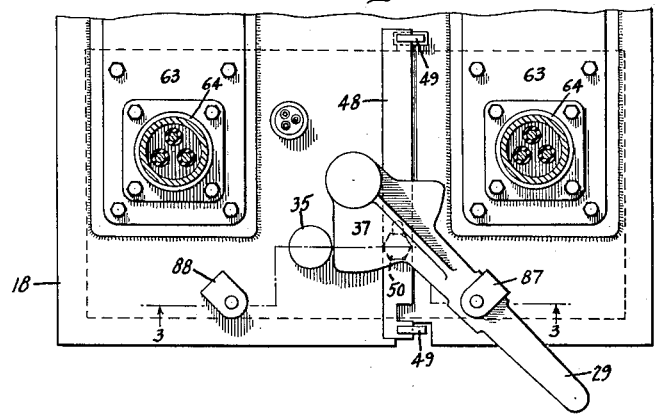
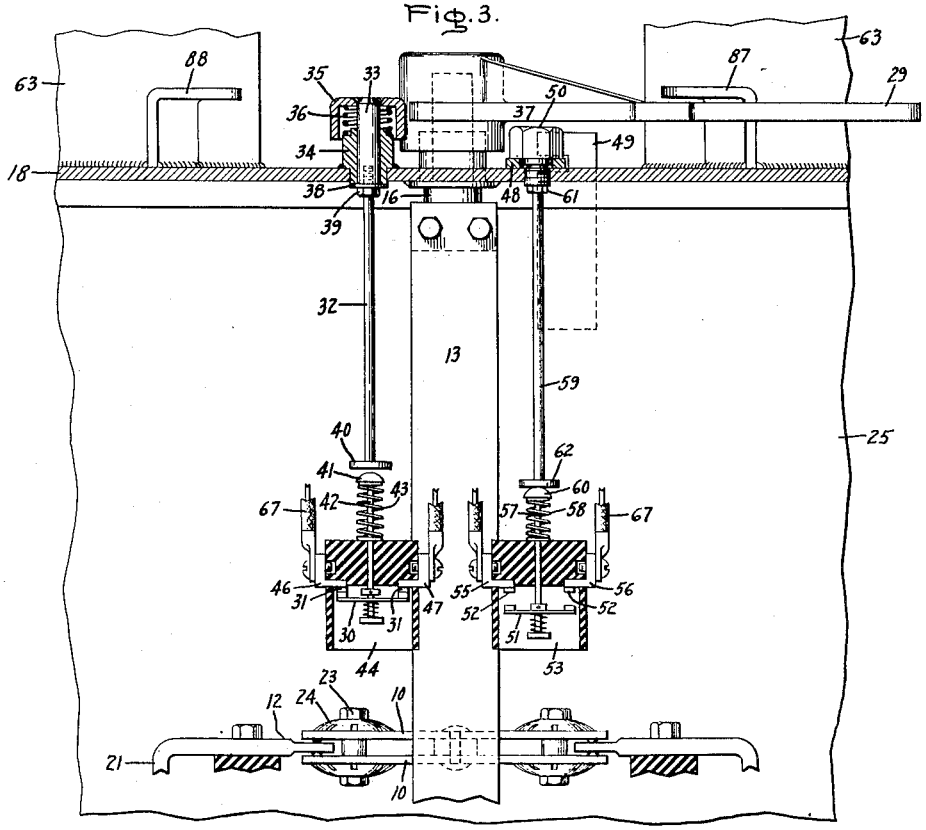
Inventors:
Phillip M. Engel,
Winton G. Harlow,
by Harry E. Dunham
Their Attorney.

Feb. 3, 1942. P. M. ENGEL ET AL 2,271,972
SWITCHING SYSTEM AND SWITCH FOR CONTROLLING ELECTRIC CIRCUITS
Filed Aug. 21, 1940 3 Sheets-Sheet 3
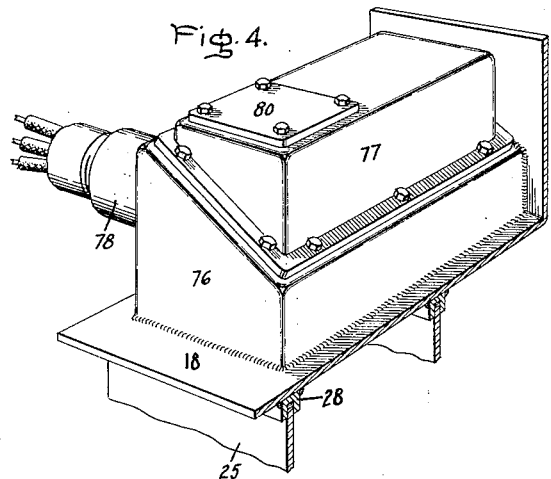
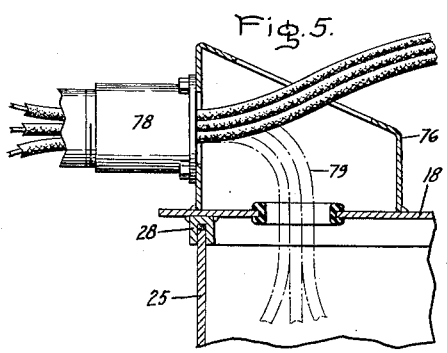
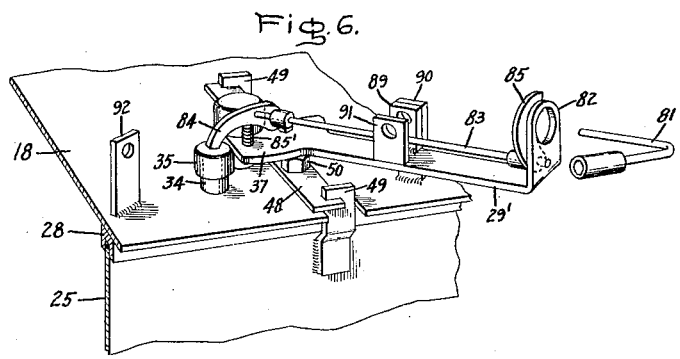
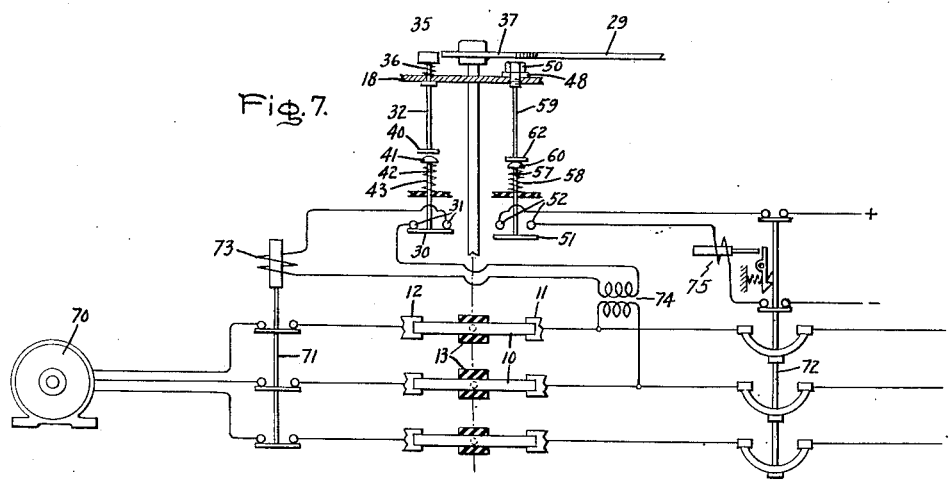
Inventors:
Phillip M. Engel,
Winton G. Harlow,
by Harry E. Dunham
His Attorney.

Patented Feb. 3, 1942

2,271,972

UNITED STATES PATENT OFFICE 2,271,972

SWITCHING SYSTEM AND SWITCH FOR CONTROLLING ELECTRIC CIRCUITS

Phillip M. Engel, Lansdowne, and Winton G. Harlow, Springfield, Pa., assignors to General Electric Company, a corporation of New York Application August 21, 1940, Serial No. 353,460

8 Claims. (Cl. 175—294)

Our invention relates to improvements in switching systems and switches for controlling electric circuits and more particularly for controlling electric circuits in hazardous locations where contaminated atmospheric conditions, involving inflammable fluids, corrosive or explosive mixtures, and the like, are apt to occur.

In certain lines of industry, for example, oil refining including the production of gasoline, certain hazards are inevitable due to contamination of the surrounding air by highly inflammable gases. These, in combination with the air, may form explosive mixtures which need only a spark to cause havoc. Also in other lines of industry, such as grain elevators, chemical plants, etc., explosive and corrosive atmospheres are present. But electrical apparatus, such as motors for example, is essential to the economical operation of such lines of industry. This apparatus requires certain controls involving switches which may produce arcs and which require maintenance and repair. Such arcs must be effectively isolated to avoid any danger of firing explosive mixtures or inflammable liquids. Moreover, the switching means must be capable of being made absolutely safe for maintenance and repair work so as to avoid electrical hazards to the operating personnel and also to prevent any possibility of electrical arcs during such maintenance and repair.

One object of our invention is to provide an improved switching system whereby a load switch, a disconnecting switch and a circuit breaker connected in series in an electric circuit can be operated only in a definite sequence such as to avoid hazard to operating personnel and danger to equipment and surroundings. A second object of our invention is to provide an improved disconnecting switch embodying controls which prevent opening the switch on a live circuit. A third object of our invention is to provide an insulating fluid immersed disconnecting switch which is easily accessible for inspection and repair but only after removal of such electrical hazards as could injure the operating personnel or damage the surroundings. A fourth object of our invention is to provide an improved disconnecting switch with an enclosing structure which facilitates the drawing of conductors in conduits and the making of switch connections in general. A fifth object of our invention is to provide such an improved system in interlocks for a plurality of switches as to render the operation of the switches relatively to each other substantially foolproof so that they can be operated with safety in hazardous locations regardless of the explosive or inflammable characteristics of the surrounding atmosphere. These and other objects of our invention will hereinafter appear in more detail.

In accordance with our invention, we provide an improved disconnecting switch with auxiliary switch control means and interlocking means therefor arranged to prevent a circuit opening operation of the disconnecting switch without first operating an auxiliary switch and to prevent removal of the disconnecting switch enclosing structure until after another auxiliary switch has been operated. Also, in accordance with our invention, the enclosing structure may contain a fluid insulating medium surrounding the disconnecting switch contacts in order to avoid danger from arcing in the event that the switch is opened on a live circuit in consequence of apparatus failure. Furthermore, in accordance with our invention, we provide an improved switching system comprising a load switch, a circuit breaker, and our improved disconnecting switch so interlocked and controlled by the auxiliary switches of the disconnecting switch as to prevent the opening of the disconnecting switch while the load switch is closed and also to prevent the removal of the fluid containing housing of the disconnecting switch while the circuit breaker is closed. Under hazardous atmospheric conditions, it is frequently important to run conductors in conduits which are connected to switch housings. In accordance with our invention, we provide an improved disconnecting switch housing which facilitates the drawing of conductors in comparatively straight lines through the connecting conduits and the running of the conductors to the terminals of the disconnecting switch.

Our invention will be better understood from the following description when considered in connection with the accompanying three sheets of drawings, and its scope will be pointed out in the appended claims.

In the accompanying drawings Fig. 1 illustrates, in perspective, with part of the housing broken away for clearness, a disconnecting switch embodying our invention. Fig. 2 is a partial top plan view of the disconnecting switch shown in Fig. 1. Fig. 3 is a sectional view of the upper portion of the disconnecting switch on the line 3—3 of Fig. 2. Fig. 4 is a perspective view showing a modification of the conduit box structure shown in Fig. 1. Fig. 5 is a transverse sectional elevation of a part of the conduit box shown in Fig. 4 illustrating the method of drawing conductors. Fig. 6 is a perspective view illustrating a modification of the operating mechanism shown in Figs. 1 and 2, and Fig. 7 illustrates diagrammatically an electric switching system embodying our invention and the disconnecting switch shown in Fig. 1.

The embodiment of our invention illustrated in Figs. 1, 2 and 3 is a three pole double break disconnecting switch each pole of which, as shown, comprises relatively movable cooperating contacts illustrated as a pair of movable switch blades 10 and cooperating stationary contacts 11 and 12 engageable by the ends of the blades. As shown, the blades 10 are pivotally mounted for rotation about a vertical axis extending between the contacts 11 and the contacts 12. For this purpose the blades 10 may be clamped edgewise, as shown, between two posts 13 of insulating material suitably secured to each other as by bolts 14 and two end blocks 15 and 16 pivoted on the switch frame base plate 17 and in a top supporting or housing plate 18. The switch supporting structure or frame further includes column members, such as angles 19 and 20, which are suitably secured as by welding to the base plates 17 and to the top plate 18. The stationary contacts 11 and 12 which, as shown, include suitable terminal portions 21 are mounted on transverse insulating members 22 suitably secured to the columns 19 and 20. In order to obtain the desired contact pressure between the ends of the blades 10 and the cooperating stationary contacts 11 and 12, suitable blade pressure means comprising a bolt 23 extending through the blades and provided with spring washers 24 in engagement with the outside of each blade may be employed.

In order to enclose the switch parts described so that any arc attendant upon opening the switch cannot be effective to ignite or cause an explosion in the surrounding atmosphere, a suitable housing 25 is provided. This housing is secured to the top plate 18 by suitable means, such as bolts 26, extending through lugs 27 on the housing. Preferably the housing contains an insulating fluid, such as oil, to a depth sufficient to immerse all of the switch contacts involved. In this case the upper edge of the housing may be set into suitable recesses formed on members 28 suitably secured to the top plate 18. These recesses will, of course, be provided with the necessary packing material to insure the desired degree of tightness.

For actuating the blade members 10 to and from the circuit closing position shown, we provide suitable operating means, such as a manually operable lever 29 which is suitably secured to the upper switch pivot 16 so as to cause rotation thereof and of the parts secured thereto when the lever 29 is moved. Thus in the illustrated embodiment of our invention shown in Figs. 1, 2 and 3 about 90° of clockwise movement of the switch lever 29 from the position shown in Figs. 1, 2 and 3 will cause the movement of the blades 10 through a corresponding angle of about 90° to the circuit opening position.

Since the switch structure shown is not primarily intended for a load circuit interrupter, we provide means for suitably interlocking the disconnecting switch with other devices, for example, circuit breakers, contactors, and the like, such that the disconnecting switch cannot be operated to the open position without first performing a preliminary operation suitable for interlocking control. As shown, this means is of an electro-mechanical type and comprises an auxiliary switch having a movable contact 30 which is operable to bridge stationary contacts 31. Further, in accordance with our invention, this auxiliary switch occupies a predetermined circuit controlling position when the disconnecting switch is closed, but it must be moved from this predetermined circuit controlling position to a different circuit controlling position before the operating lever 29 can be actuated to open the disconnecting switch.

For this control of the auxiliary switch 30—31, we provide an operating member 32 which is mounted on the top plate 18 so as to have a limited vertical movement relatively thereto. Moreover, in accordance with our invention, this operating member is biased to a position such as to prevent movement of the operating lever 29. For this purpose the operating rod 32 is suitably attached to a cylindrical member 33 which is slidable in a bushing 34 secured to the top plate 18. Between the top of the bushing 34 and an inverted cup-shaped member 35 suitably secured to the member 33, as by welding, there is positioned suitable resilient means, such as a compression spring 36 which tends to push the cup-shaped member 35 to the position shown in Figs. 1, 2 and 3 in the path of movement of a wing extension 37 on the operating lever 29. For adjustment and sealing purposes, the rod 32 may be screwed into the cylindrical member 33 and provided with a backing washer 38 and a lock nut 39. This arrangement is such that the spring 36 tends to maintain the push rod 32 and its flattened end 40 out of engagement with a button 41 positioned on a rod 42 on which the movable switch contact 30 is preferably resiliently mounted, as shown. The switch rod 42 is biased upwardly by suitable means, such as a spring 43, tending to maintain the auxiliary contacts 30—31 in the closed position shown. The stationary contacts 31 are positioned within a chamber 44 formed of insulating material. Secured to this chamber, which is supported on a member 45 fastened to one of the frame columns 20, are terminals 46 and 47. With this arrangement, it will be obvious that, by pushing down on the cup-shaped member 35, the flattened end 40 of the operating rod 32 engages the button 41 on the switch rod 42 to compress the spring 43 and move the contact 31 to the open position. When this movement is effected, the cup-shaped member 35 is clear of the wing extension 37 on the operating lever 29 so that this lever is free to be moved clockwise to open the disconnecting switch.

Since it would be dangerous to operating and maintenance personnel as well as inviting the possibility of explosion if it were possible to lower the fluid containing housing or tank 25 while the disconnecting switch was carrying current or had any live line terminals, we provide means for preventing such possibility. Further in accordance with our invention, this means is arranged not only mechanically to interlock the housing 25 so that it cannot be lowered while the disconnecting switch is closed but also to provide suitable electric interlocking control with other switching means in the same circuit so that these must be first operated to cause the interruption of the circuit in which the disconnecting switch is connected before it can be opened. As shown in Figs. 1, 2 and 3, the arrangement for preventing the lowering of the tank 25 until the disconnecting switch is opened comprises an interlocking bar 48 the ends of which are arranged in the interlocking position to engage notched members 49 secured to the tank 25.

The interlocking bar 48 rests on the upper side of the top plate 18 and is arranged to be secured thereto in the interlocking position so as to prevent any movement of the bar while the disconnecting switch is closed. For this purpose the interlocking bar 48 is provided with a circular hole large enough to pass the shouldered portion of the nut 50 which screws into the top plate 18 and positions the locking bar so that its ends engage the recesses in the members 49. This nut 50 lies under the inner widened end of the operating lever 29 so that the nut is not accessible until the disconnecting switch is in the full open position. The cylindrical portion of the nut 50 just below the hexagonal portion thereof is of such a diameter as to have a turning fit in the circular hole in the interlocking bar 48 so as to insure the correct centering of this bar. To one side of this hole, as shown in dotted lines in Fig. 2, the hole in the bar is extended. This extension is narrower but of sufficient width to pass the threaded portion of the nut 50 and permits movement of the bar from the interlocking position without completely withdrawing the nut from the top plate 18.

For obtaining an interlocking control of other switches, in accordance with another feature of our invention, we provide a second auxiliary switch which is arranged to be controlled in dependence on the position of the nut 50. As shown, this second auxiliary switch comprises a movable contact 51 which is arranged to engage contacts 52. This switch structure is analogous to the auxiliary switch structure previously described, the contacts being mounted within a chamber 53 formed of insulating material and mounted on a bracket 54 which is secured to one of the switch frame columns 20. This second auxiliary switch is also provided with terminals 55 and 56.

This second auxiliary switch has its movable contact 51 mounted on an operating rod 57 which is biased by suitable means such as a compression spring 58 in a direction tending to close the switch in the arrangement shown. In order to have the switch in a predetermined position when the tank 25 is in the normal position shown with the tank interlocking position, a rod 59 movable with the nut 50 is arranged to engage the button 60 on the rod 57 to hold the contact 51 away from the contacts 52. The rod 59 may be threaded into the nut 50 for adjustment purposes and a lock nut 61 used to maintain the setting. With this arrangement, it will be obvious that, when the nut 50 is backed off to release the interlock bar 48, the flat portion 62 on the rod 59 is raised to permit the spring 58 to close the switch 51, 52.

As shown more clearly in Fig. 1, the top plate 18 may be provided with conduit boxes 63 having main conduit openings at the top and side for receiving conduit bushings 64 which may be bolted in place, as shown, or inserted in holes 65 in the top plate 18 and suitably fastened thereto by piping or otherwise as the conduit installation exists. The main wiring 66 extends through openings in the top plate 18 and the different wires may be spaced within the tank 25 by suitable spacing means 66' of insulating material mounted on the columns 19 and 20, as shown in Fig. 1. Control wiring 67 from the auxiliary switches 30, 31 and 51, 52 may be led upward from the terminals 46, 47 and 55, 56, respectively, of these switches through an opening in the top plate 18, as shown in Fig. 1, and carried therefrom in any suitable conduit.

In Fig. 7 we have illustrated an embodiment of our invention in a switching system for a translating device, such as an electric motor 70, whose circuit includes a contactor 71, a disconnecting switch embodying the features shown in Figs. 1, 2 and 3, and a circuit breaker 72. For use in explosive and inflammable atmospheres, the motor 70 will be, in general, of the arc-proof enclosed type and the contactor 71 of the oil immersed type. This contactor has an operating winding 73 which, when energized, closes the contactor and maintains it closed as long as it is kept energized. The circuit of this winding may be energized through any suitable means, such as a potential transformer 74, connected across one phase of the motor circuit between the disconnecting switch and the circuit breaker, as shown.

In order to prevent an opening operation of the disconnecting switch while current is flowing to the motor, the contacts of the auxiliary switch 30, 31 are included in series in the circuit of the winding 73 so that, upon the opening operation of this switch to permit the opening operation of the operating lever 29 of the disconnecting switch, the circuit of the contactor winding 73 is opened. This deenergizes the winding 73 of the contactor 71 to cause the opening of this contactor and the deenergization of the motor 70.

The circuit breaker 72 is shown as of the latched closed type and is provided with a tripping coil 75 the circuit of which is arranged to be controlled by the auxiliary switch 51, 52 so that operation of the nut 50 to release the interlock bar 49 causes the closing of this auxiliary switch whose contacts are in series with the trip coil 75 whereby to effect the opening of the circuit breaker 72 so that the disconnecting switch is not alive when the tank is removed. The circuit breaker 72 may be a main line breaker, but if it is positioned in an atmosphere contaminated with inflammable or explosive gases, it should be of a type incapable of producing any exposed arcs. Thus it may be an oil circuit breaker examples of which are well known to the art.

Instead of having the conduit box of the unitary type shown in Fig. 1, it may comprise top and bottom portions 77 and 76, respectively, which, in accordance with our invention, are separable on a plane inclined at an acute angle to one of the faces of the box as shown in Figs. 4 and 5, whereby to provide a more facile way for drawing wires through the conduits into the boxes and thence running them into the interior of the switch. Thus, referring to Fig. 4 and more especially Fig. 5, it will be obvious that, if the conduit comes in from the side, as shown in these figures, through a bushing 78, the wires may be drawn more nearly straight through the opening in the lower portion 76 of the conduit box. Thence the wires may be bent inwardly and down into the switch, as shown by the dash and dot lines 79. In other words, all the drawing may be accomplished in straight lines and the wires then bent to thread them into the lower portion of the switch. If the wires are brought in through a top opening covered by a cover plate 80, for example, then the pull is a straight pull anyway, and no great trouble is experienced.

Thus in either case the drawing of the conduit wires is facilitated by the two-part conduit box construction substantially in the form of a rectangular parallelepiped in which the two parts engage each other on a common plane inclined at a suitable angle to one side of the conduit box.

In Fig. 6 we have shown a modification of the operating lever 29 of Fig. 1 whereby, with a single operating member, such as a switch hook 81, the downward movement of the cup 35 may be first effected so that further pull on the operating hook causes the opening of the disconnecting switch. For this purpose the operating lever 29' is provided with an upstanding leg 82 containing an eye for insertion of the switch hook 81. For moving the cup 35 downwardly, we provide an operating shaft 83 to which is secured an operating arm 84 engageable with the cup 35 when the shaft 83 is rotated in a direction to cause downward movement of the free end of the arm 84. In order to cause this desired movement by pulling on the switch hook 81, the shaft may be provided with a crank 85 in the form of a wing extending partially across the opening in the upstanding leg 82 of the lever 29'. Thus, when the switch hook 81 is inserted in the eye of this upstanding leg and pulled outwardly, the crank 85 is turned against the bias of a spring 85' in a direction to cause the arm 84 to push the cup 35 down and thus permit the operating lever to swing clear of this cup but only after the auxiliary switch 30, 31 has been opened.

Since it may be desirable at times to prevent any operation of the disconnecting switch, means may be provided to lock the lever 29 in either position. As shown in Fig. 2, this means comprises an opening in the operating lever 29 which registers with corresponding openings in brackets 87 and 88 secured to the top plate 18. Suitable padlocks may be inserted in these openings to maintain the switch in the open or closed position so that no change may be made in the conducting condition of the circuit except by those possessing the key to the lock. As shown in Fig. 6, the interlocking may be similarly effected by inserting padlocks through registering openings in a plate 89 mounted on the operating lever 29' and a plate 90 mounted on the top plate 18 or in a plate 91 on the operating lever 29' and a plate 92 on the top plate 18.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States is:

1. A disconnecting switch comprising relatively movable cooperating contacts, a housing for said contacts comprising a removable fluid container, means adapted to be operated to effect the opening operation of said disconnecting switch contacts, a first auxiliary switch, means requiring the actuation of said first auxiliary switch to a predetermined circuit controlling position before the opening operation of said disconnecting switch operating means can be effected, means for preventing the removal of said fluid container while the disconnecting switch contacts are in the closed position, a second auxiliary switch, means for effecting a circuit controlling operation of said second auxiliary switch after the opening operation of the disconnecting switch contacts and prior to the removal of said container, and means for maintaining the first auxiliary switch in said predetermined circuit controlling position as long as the disconnecting switch is open.

2. A disconnecting switch comprising relatively movable cooperating contacts, a housing for said contacts comprising a removable fluid container, means adapted to be operated to effect the opening operation of said disconnecting switch contacts, a first auxiliary switch mounted within said container, means requiring the actuation of said first auxiliary switch to a predetermined circuit controlling position before the opening operation of said disconnecting switch operating means can be effected, means for preventing the removal of said fluid container while the disconnecting switch contacts are in the closed position, a second auxiliary switch mounted within said container, means for effecting a circuit controlling operation of said second auxiliary switch after the opening operation of the disconnecting switch contacts and prior to the removal of said container, and means for maintaining the first auxiliary switch in said predetermined circuit controlling position as long as the disconnecting switch is open.

3. An electric circuit switching system comprising a circuit breaker, a disconnecting switch and a load switch in series relation, means for effecting the opening of said circuit breaker, means for effecting the opening of said load switch, a housing for said disconnecting switch comprising a removable fluid container, means adapted to be operated to open said disconnecting switch, means for requiring the opening operation of said load switch opening means before the opening operation of said disconnecting switch operating means can be effected, and means for preventing the removal of said fluid container while the disconnecting switch is closed adapted to be operated after the opening of the disconnecting switch to effect the operation of the circuit breaker opening means prior to the removal of the container.

4. An electric circuit switching system comprising a circuit breaker, a disconnecting switch and a load switch in series relation, means for effecting the opening of said circuit breaker, means for effecting the opening of said load switch, a housing for said disconnecting switch comprising a removable fluid container, means adapted to be operated to open said disconnecting switch, electro-mechanical interlocking means for requiring the opening operation of said load switch opening means before the opening operation of said disconnecting switch operating means can be effected, and electro-mechanical interlocking means for preventing the removal of said fluid container while the disconnecting switch is closed adapted to be operated after opening the disconnecting switch to effect the operation of the circuit breaker opening means prior to the removal of the container.

5. A disconnecting switch comprising relatively movable cooperating contacts, a housing for said contacts comprising a removable fluid container, means adapted to be operated to effect the opening operation of said disconnecting switch contacts, a first auxiliary switch mounted within said container, means requiring a circuit controlling operation of said first auxiliary switch before the opening operation of said disconnecting switch operating means can be effected, means for preventing the removal of said fluid container while the disconnecting switch contacts are in the closed position, a second auxiliary switch mounted within said container, and means for effecting a circuit controlling operation of said second auxiliary switch after the opening operation of the disconnecting switch contacts and prior to the removal of said container.

6. A disconnecting switch comprising relatively movable cooperating contacts, a housing for said contacts comprising a removable fluid container, means adapted to be operated to effect the opening operation of said disconnecting switch contacts, a first auxiliary switch, means requiring a circuit controlling operation of said first auxiliary switch before the opening operation of said disconnecting switch operating means can be effected, means for preventing the removal of said fluid container while the disconnecting switch contacts are in the closed position, a second auxiliary switch, and means for effecting a circuit controlling operation of said second auxiliary switch after the opening operation of the disconnecting switch contacts and prior to the removal of said container.

7. A disconnecting switch comprising relatively movable cooperating contacts, a housing for said contacts comprising a removable fluid container, means adapted to be operated to effect the opening operation of said disconnecting switch contacts, a first auxiliary switch operable to the closed position upon the closing of said disconnecting switch, means requiring the opening of said first auxiliary switch before the opening operation of said disconnecting switch operating means can be effected, means for preventing the removal of said fluid container while the disconnecting switch contacts are in the closed position, a second auxiliary switch mounted within said container, means for maintaining said second auxiliary switch in the open position when the disconnecting switch is closed, means for effecting the opening of said second auxiliary switch after the opening of the disconnecting switch and prior to the removal of said container, and means for maintaining the first auxiliary switch in the circuit open position as long as the disconnecting switch is open.

8. A disconnecting switch comprising relatively movable cooperating contacts, a housing for said contacts comprising a removable fluid container, means adapted to be operated to effect the operation of said disconnecting switch, a first auxiliary switch operable to the closed position upon the closing of said disconnecting switch, means requiring the opening of said first auxiliary switch before the opening operation of said disconnecting switch can be effected, means for preventing the removal of said fluid container while the disconnecting switch contacts are in the closed position, a second auxiliary switch mounted within said container, means for maintaining said second auxiliary switch in the open position when the disconnecting switch is closed, and means for effecting the opening of said second auxiliary switch after the opening of the disconnecting switch and prior to the removal of said container.

PHILLIP M. ENGEL.
WINTON G. HARLOW.